United States Patent
Walker

(10) Patent No.: US 6,672,576 B1
(45) Date of Patent: Jan. 6, 2004

(54) APPARATUS FOR AND METHOD OF UTILIZING VACUUM IN MACHINE TOOL OPERATIONS

(75) Inventor: Charles M. Walker, Beech Island, SC (US)

(73) Assignee: United Defense LP, Arlington, VA (US)

( * ) Notice: Subject to any disclaimer, the term of this patent is extended or adjusted under 35 U.S.C. 154(b) by 0 days.

(21) Appl. No.: 10/309,708

(22) Filed: Dec. 3, 2002

Related U.S. Application Data

(60) Provisional application No. 60/337,468, filed on Dec. 3, 2001.

(51) Int. Cl.⁷ .............................................. B25B 11/00
(52) U.S. Cl. ........................................ 269/21; 29/559
(58) Field of Search ................... 269/21, 20; 294/64.1, 294/64.2; 279/3; 248/362; 29/559

(56) References Cited

U.S. PATENT DOCUMENTS

| | | | | |
|---|---|---|---|---|
| 5,553,837 A | * | 9/1996 | Kahle | 269/21 |
| 5,562,276 A | * | 10/1996 | Blick | 269/20 |
| 5,572,786 A | * | 11/1996 | Rensch | 29/559 |
| 6,196,532 B1 | * | 3/2001 | Otwell | 269/21 |
| 6,419,216 B1 | * | 7/2002 | Susnjara | 269/21 |
| 6,446,948 B1 | * | 9/2002 | Allen | 269/21 |
| 6,502,808 B1 | * | 1/2003 | Stone et al. | 269/21 |

* cited by examiner

*Primary Examiner*—Lee D. Wilson
(74) *Attorney, Agent, or Firm*—The Kline Law Firm

(57) ABSTRACT

An apparatus for and method of utilizing vacuum in machine tool operations utilizes vacuum, rather than clamps and fixtures, to secure the work piece to the table of the machine tool. The apparatus employs a plurality of vacuum buttons arranged on a vacuum plate or a configurable vacuum plate. This system minimizes the downtime for machine tools by permitting the set up for a particular machining operation or series of operations to be conducted off line. That is, the set up for one operation is primarily made while the machine tool is performing another operation or series of operations on another work piece. The machine tool continues to operate producing one machined, useful product while the set up for a second product is being performed. The use of a plurality of vacuum buttons arranged on a vacuum plate allows the flexibility to accommodate a variety of different work pieces.

18 Claims, 5 Drawing Sheets

APPARATUS FOR AND METHOD OF UTILIZING VACUUM IN MACHINE TOOL OPERATIONS

Applicant claims priority of U.S. provisional application serial No. 60/337,468, filed Dec. 3, 2001.

BACKGROUND OF THE INVENTION

1. Field of the Invention

The present invention relates generally to machining tools, and more particularly is an apparatus that allows the use of vacuum in lieu of clamps and fixtures to retain a work piece in place during a machining operation, and to methods for using the same.

2. Description of the Prior Art

Machine tools, especially those that perform a plurality of operations such as drilling and milling, for example, require the work piece to be properly positioned on and secured to the movable table of a machine tool. Because such machine tools are expensive, often costing millions of dollars, it is important that the down time, i.e., the time when the tools are not performing their intended functions, be held to a minimum.

In the past clamps and fixtures have been used to mechanically position and secure work pieces. However, these devices require an extended period of downtime not only for the initial securing of the work piece to the table of the machine tool, but also to permit removal and/or repositioning of clamps during the operating cycle of the machine tool whenever a previously positioned clamp would interfere with the continued cycling of the machine tool. While vacuum has been used in the past to hold various objects in a predetermined position, such prior art devices have lacked the flexibility this invention provides.

SUMMARY OF THE INVENTION

The present invention is an apparatus for and method of utilizing vacuum in machine tool operations utilizes vacuum, rather than clamps and fixtures, to secure the work piece to the table of the machine tool. The apparatus employs a plurality of vacuum buttons arranged on a vacuum plate or a configurable vacuum plate. This system minimizes the downtime for machine tools by permitting the set up for a particular machining operation or series of operations to be conducted off line. That is, the set up for one operation is primarily made while the machine tool is performing another operation or series of operations on another work piece. The machine tool continues to operate producing one machined, useful product while the set up for a second product is being performed. The use of a plurality of vacuum buttons arranged on a vacuum plate allows the flexibility to accommodate a variety of different work pieces.

An advantage of the present invention is that it uses a vacuum, rather than clamps and fixtures, to hold the work piece in place.

Another advantage of the present invention is that a set up for a second product can be performed while a first product is being machined.

A still further advantage of the present invention is that it can accommodate a variety of different work pieces.

DETAILED DESCRIPTION OF THE INVENTION

Figure 1:
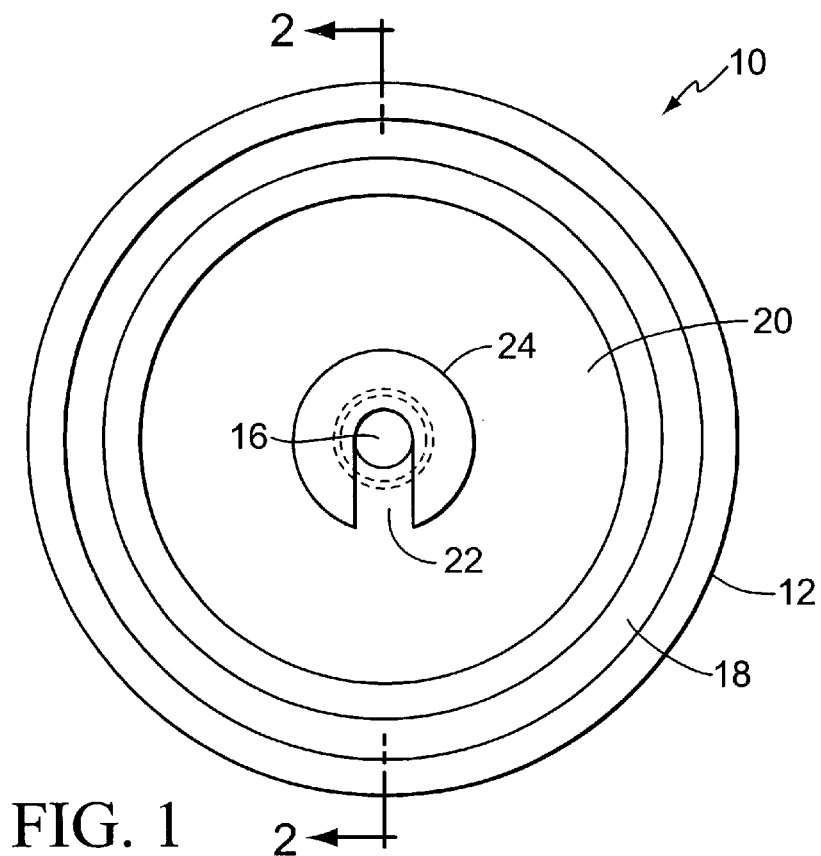
FIG. 1 is a top view of a vacuum button according to the present invention.
Figure 2:
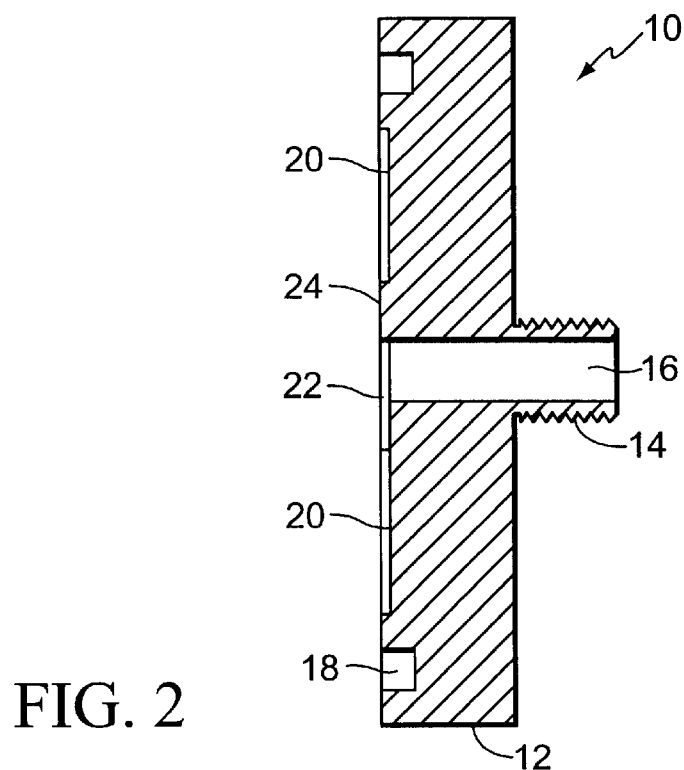
FIG. 2 is a sectional view taken along line 2—2 of FIG. 1.

Referring first to FIGS. 1 and 2, the present invention utilizes a vacuum button 10 having a cylindrical body 12 with a threaded cylindrical protrusion 14 formed on its lower side. A central opening 16 extends through both the protrusion 14 and the body 12. The upper surface of the body 12 includes an annular groove 18 formed near an outer periphery of the body 12 to accept a seal. The seal may be a conventional O-ring seal or an equivalent formed of linear seal material cut to a length equal to the circumference of the groove 18, and with the free ends of the material glued together to form a complete seal.

An annular recess 20 is formed on the upper side of the body 12 and communicates with the opening 16 though a slot 22 formed in the central portion 24 of the upper surface of body 12. The central portion 24 and the upper surface of the body 12 around the groove 18 contact the work piece, (not shown in FIGS. 1 and 2). Vacuum applied to the groove 18 and the recess 20 through the opening 16 permit atmospheric pressure to hold the work piece from moving relative to the button 10. The force applied by the vacuum is the product of atmospheric pressure and the area over which such pressure is applied. Atmospheric pressure is about 14.5 psi, which would produce slightly more than 71 pounds of vacuum force if the button 10 has a diameter of 2.5 inches.

In light of this fact, it is clear that the vacuum force applied by an individual button can be increased by simply increasing the diameter of that button. However, as the diameter of the button 10, and therefore the applied force, increases, so does the possibility that the work piece will be deflected or otherwise distorted by the vacuum force. Such distortion is a significant concern when the work piece is relatively thin. In order to reduce distortion, it is necessary to provide additional physical support in the button for the work piece.

Figure 3:
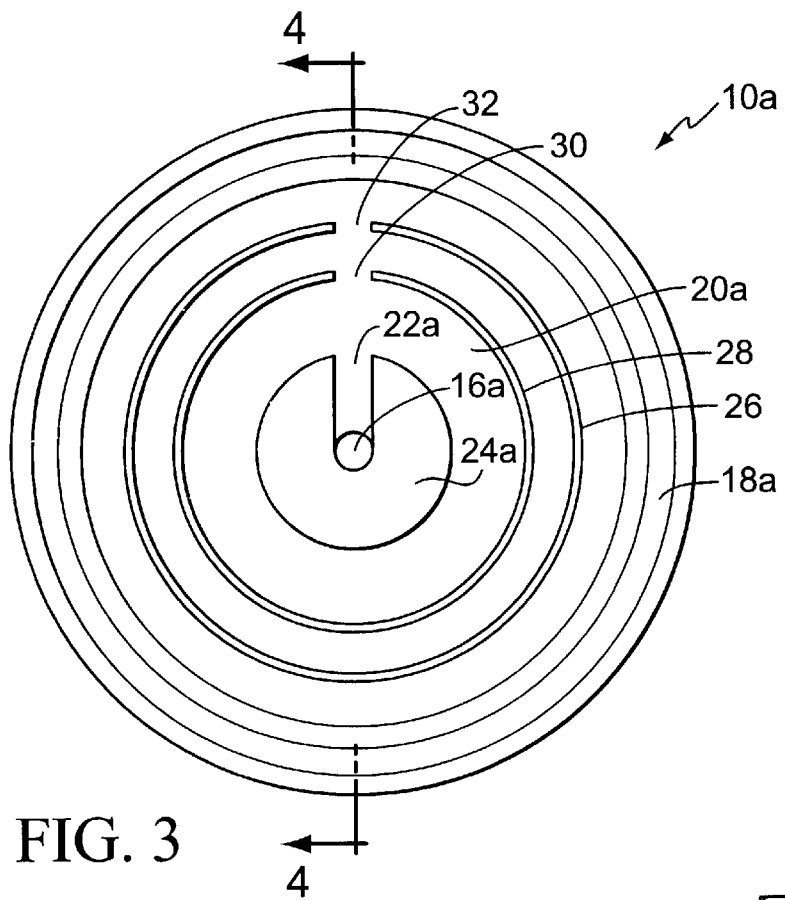
FIG. 3 is a top view of a larger size vacuum button according to the present invention.
Figure 4:
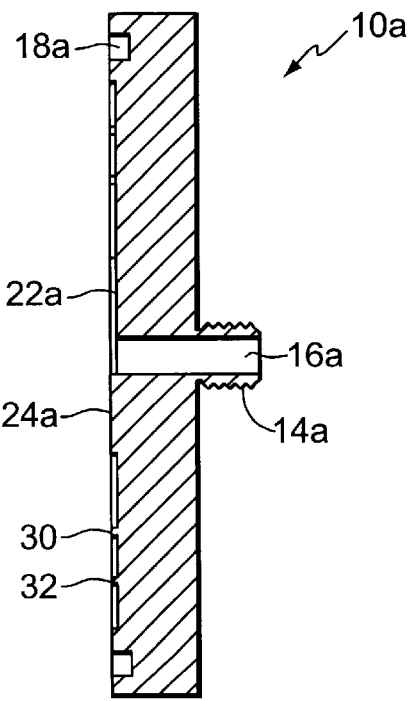
FIG. 4 is a sectional view taken along line 4—4 of FIG. 3.
Figure 5:
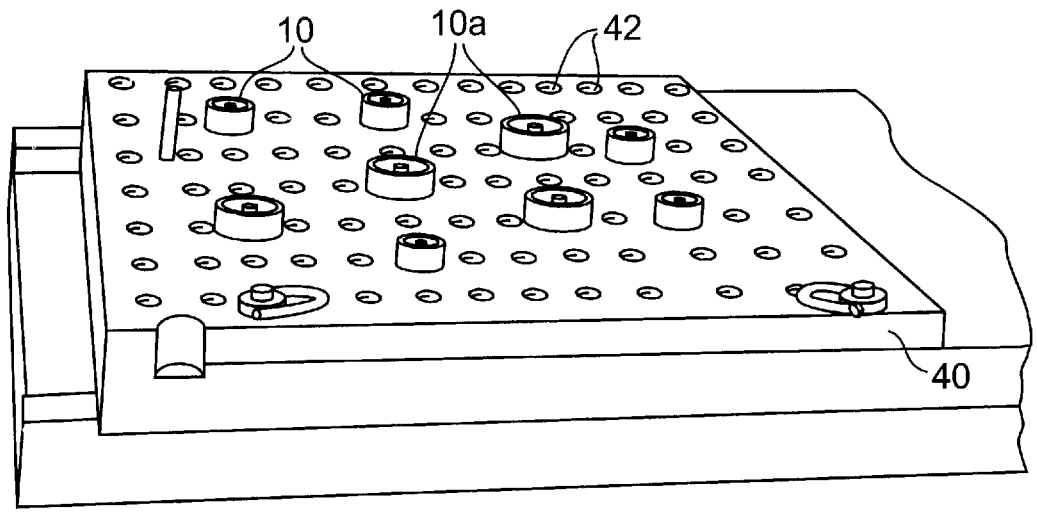
FIG. 5 is a perspective view of a vacuum button fixture plate mounted on a dual zone, vacuum base plate with a plurality of vacuum buttons positioned on the base plate.

FIGS. 3 and 4 show a second embodiment of the vacuum button, button 10a, which is identical in most respects to the button 10 shown in FIGS. 1 and 2. Reference numbers of the equivalent elements will be differentiated by the addition of an "a". The chief difference is that button 10a has a larger diameter. The button 10a provides additional physical support for the work piece by incorporating concentric support ribs 26 and 28 that are formed in the recess 20a. The support ribs 26 and 28 have gaps 30 and 32 respectively aligned with the slot 22a to assure an even distribution of vacuum throughout the recess 20a.

As can be seen in FIGS. 5–8, a button fixture plate 40 is provided with a plurality of threaded holes 42 arranged in rows and spaced apart an equal distance, with adjacent rows being spaced apart a distance equal to the spacing between the holes within a row to form a uniform grid pattern. The threaded protrusions 14, 14a of buttons 10, 10a are received in threaded holes 42. The buttons 10, 10a are threaded into selected holes 42 to accommodate the shape of a given work piece. Threaded plugs are used to plug those holes 42 in the grid pattern that are not selected for engagement by one of the buttons 10, 10a. In order to ensure that an airtight seal is formed between the threaded connection of the plugs and the threaded holes 42 in the button plate 40, a sealing material, preferably a dry sealant, is applied.

The positioning of the buttons 10, 10a is also dictated by the need to avoid contact with a cutting tool. The buttons 10, 10a hold the work piece in a position elevated from the underlying vacuum base plate 50. This elevation permits a cutting tool, such as a drill bit for example, to completely penetrate the work piece. However, it is critical that the cutting tool does not also cut into the button 10, 10a. Contact with the cutting tool would damage the button 10, 10a, which could compromise the vacuum seal holding the work piece in place, thereby endangering the work piece.

The embodiment of the base plate 50 shown in the drawings has two independent vacuum zones, but a base plate with either a single zone or more than two zones will function in the same manner. For simplicity, the following description will address only the zone appearing in the foreground of FIG. 9. It is to be understood that the description will apply to the zone in the background, and any other zone utilized in the base plate of a given application, as well.

Figure 6:
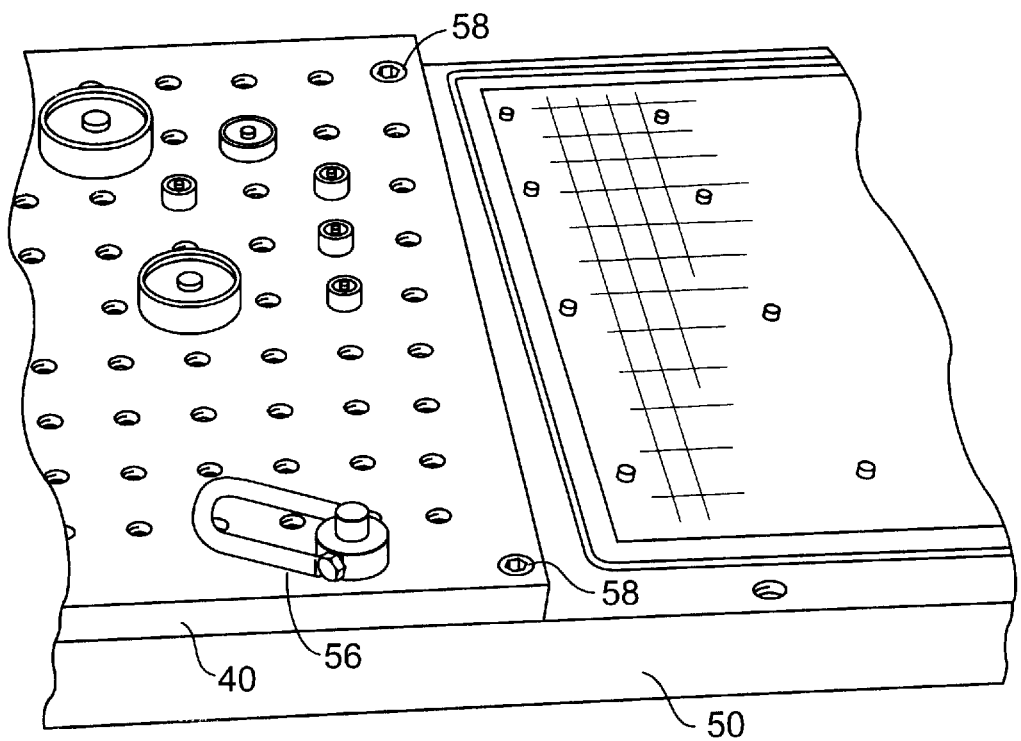
FIG. 6 is a more detailed perspective view showing the fixture plate and base plate of FIG. 5.
Figure 7:
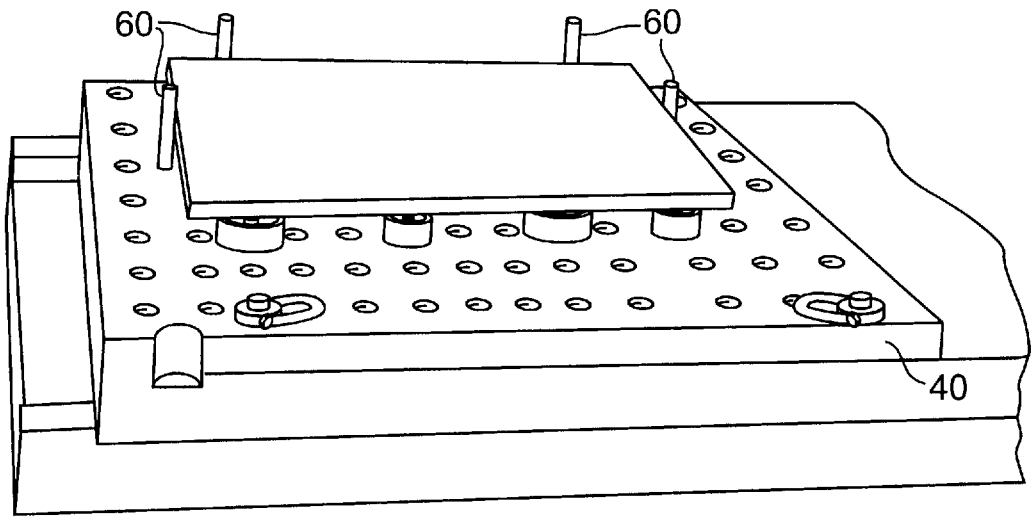
FIG. 7 is a perspective view of the fixture plate shown in FIGS. 5 and 6 with a work piece positioned on the fixture plate.
Figure 8:
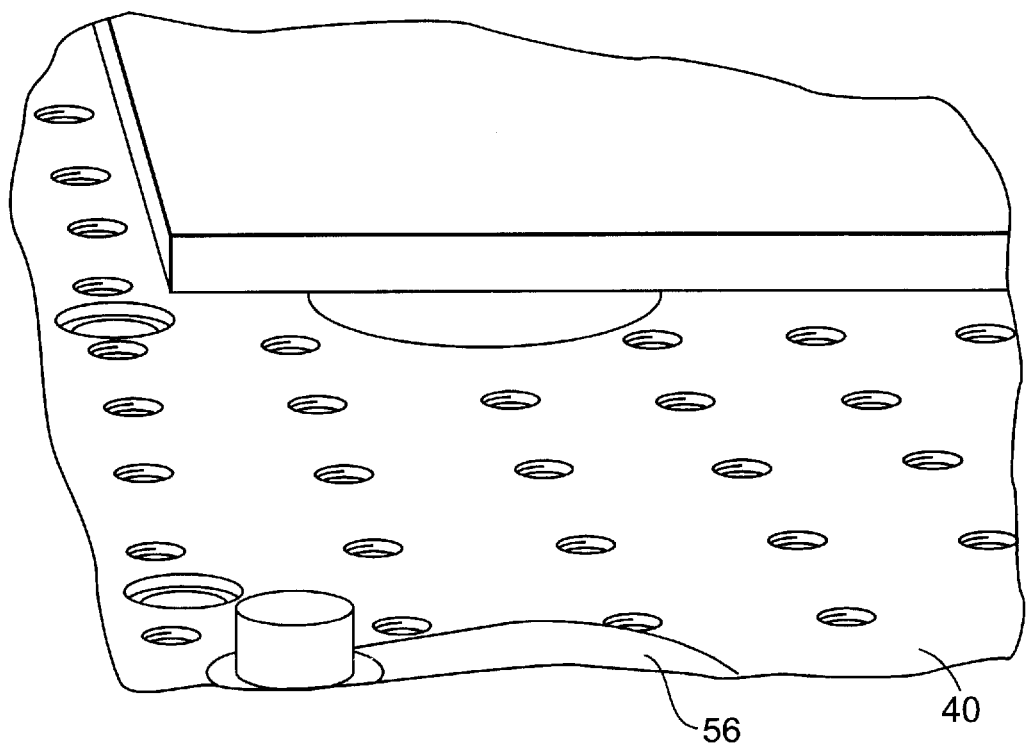
FIG. 8 is a more detailed perspective view of the fixture plate and work piece shown in FIG. 7.
Figure 9:
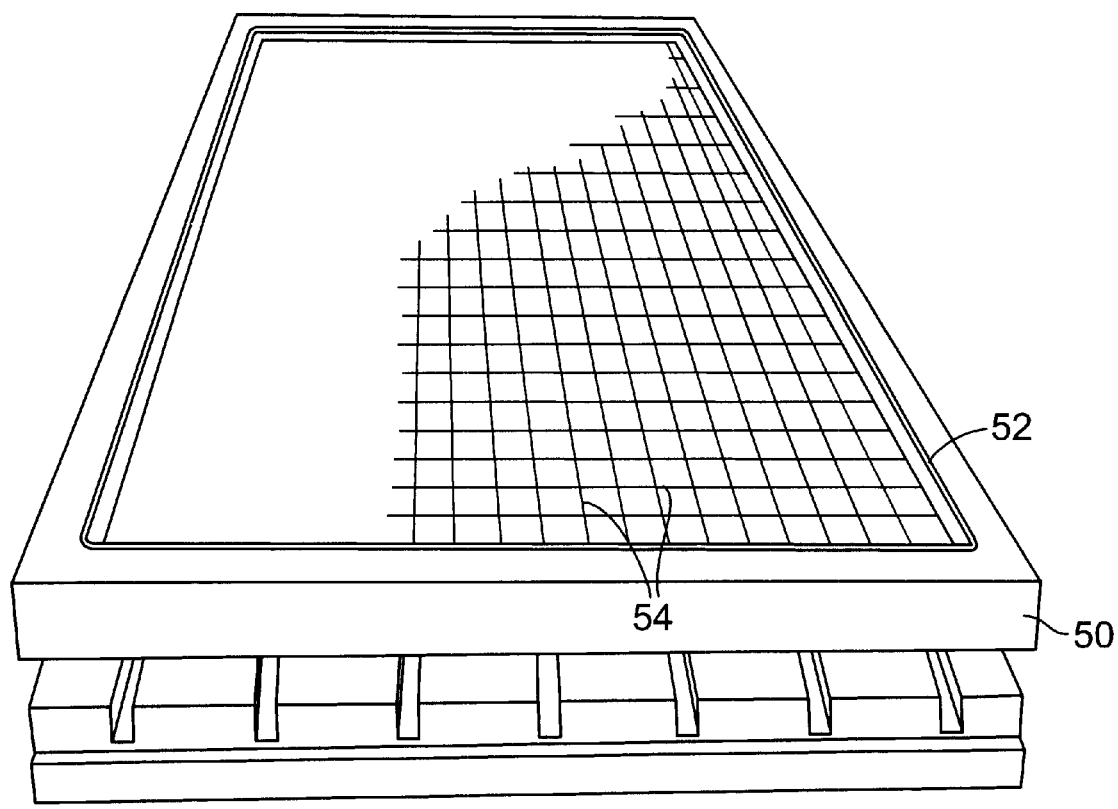
FIG. 9 is a perspective view of a vacuum base plate constructed according to the present invention and having two independent vacuum zones.

The foreground zone of the vacuum base plate 50, as best seen in FIGS. 6 and 9, is defined by a groove 52 encircling the zone with a seal positioned therein. The zone has a plurality of connected grooves 54 arranged in a grid pattern, which pattern is complementary to the grid pattern of the holes 42 in the button fixture plate 40. A vacuum pump, (not shown), is used to evacuate air from the grooves 54 to create a vacuum therein. Since the grooves 54 are aligned with the grid pattern of the holes 42 in a button fixture plate 40, the airways in vacuum buttons 10, 10a will also be evacuated. The vacuum thus created in the buttons 10, 10a will serve to hold the work piece in place.

The arrangement or positioning of the buttons 10, 10a and the plugs in the button fixture plate 40 can be done off line. The button fixture plate 40 is prepared by fully and properly seating sealing plugs and buttons 10, 10a in the desired pattern. The button fixture plate 40 is then raised by a power lift by means of lifting eyes 56 attached to the button plate 40 and lowered into position on the base plate 50. Tie down bolts 58 extend through holes in the button plate 40 to engage threaded holes in the base plate 50. While vacuum alone will hold the plate 40 in engagement with the base plate 50, the tie down bolts will ensure three things: (1) that the button plate 40 is properly aligned with base plate 50 (2) separation of the work piece from the buttons 10, 10a when the machining operation is complete and the work piece is lifted, and (3) chips created during the machining operations will not migrate between the button fixture plate 40 and the vacuum base plate 50.

Once the vacuum is applied to the system, the work piece will be held in position on the buttons 10, 10a. In order to ensure that the work piece is in its proper position before the vacuum is applied, locating pins 60 are inserted into bushings positioned in holes 42 in the button fixture plate 40. The work piece is pushed into engagement with the pins 60 prior to application of the vacuum, i.e., before starting the vacuum pump.

If the work piece will not be penetrated by a tool, it is possible to employ a universal plate with a grid of grooves around holes arranged in the same manner as those in the button plate 40. A linear seal is inserted into the grooves in a manner to conform to the shape of the work piece. The holes that are outside of such shape are sealed by plugs as described above. The universal plate is then bolted to the vacuum base plate 50 in the same manner as the button plate 40, and the work piece is positioned thereon.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A device to secure a work piece in a machining operation comprising:

a base plate, a removable button fixture plate, and at least one vacuum button; wherein said base plate comprises means for providing vacuum to a plurality of grooves in said base plate, said button fixture plate comprises a plurality of holes, each said hole being able to receive one of said vacuum buttons, and each said vacuum button comprises a main body and a protrusion that is received in one of said holes, the vacuum from said base plate passing through said holes in said button fixture plate and through a central opening in said vacuum button; such that vacuum created by said base plate passes through said button fixture plate to secure a work piece placed on said at least one vacuum button.

2. The device of claim 1 wherein:

said vacuum button comprises a slot in a central portion of said main body, said slot being in communication with said central opening and with an annular recess, said annular recess providing a vacuum area for said vacuum button.

3. The device of claim 1 wherein:

said vacuum button comprises an annular groove on an upper surface thereof to accept a sealing element.

4. The device of claim 1 wherein:

said vacuum button comprises at least one support rib raised above a surface of said annular recess, a top surface of said support rib being coplanar with a top surface of said main body of said vacuum button.

5. The device of claim 4 wherein:

said support rib comprises a gap therein, said gap being aligned with said slot in said central portion of said vacuum button so that an airway is formed through said slot and said gap.

6. The device of claim 1 wherein:

said holes in said button fixture plate comprise threads that mate with threads on said protrusion of said vacuum button.

7. The device of claim 1 wherein:

said holes in said button fixture plate are aligned in horizontal and vertical rows.

8. The device of claim 1 wherein:

at least one locating pin is inserted into one of said holes in said button fixture plate, said locating pin being in contact with said work piece such that said work piece is secured in a proper position.

9. A securing mechanism in combination with a vacuum base plate comprising:

a removable button fixture plate, and at least one vacuum button; wherein said vacuum base plate comprises means for providing vacuum to a plurality of holes in said button fixture plate, each said hole being able to receive one of said vacuum buttons, and each said vacuum button comprises a main body and a protrusion that is received in one of said holes, the vacuum from said base plate passing through said holes in said button fixture plate and through a central opening in said vacuum button; such that vacuum created by said base plate passes through said button fixture plate to secure a work piece placed on said at least one vacuum button.

10. The securing mechanism of claim 9 wherein:

said vacuum button comprises a slot in a central portion of said main body, said slot being in communication with said central opening and with an annular recess, said annular recess providing a vacuum area for said vacuum button.

11. The device of claim 9 wherein:

said vacuum button comprises an annular groove on an upper surface thereof to accept a sealing element.

12. The device of claim 9 wherein:

said vacuum button comprises at least one support rib raised above a surface of said annular recess, a top surface of said support rib being coplanar with a top surface of said main body of said vacuum button.

13. The device of claim 12 wherein:

said support rib comprises a gap therein, said gap being aligned with said slot in said central portion of said vacuum button so that an airway is formed through said slot and said gap.

14. A vacuum button adapted for use in securing a work piece in a machining operation comprising:

a main body with at least one support rib raised above a surface of said annular recess, a top surface of said support rib being coplanar with a top surface of said main body, a protrusion, an annular recess in a top surface of said main body, and a central opening; wherein an airway is formed through said central opening and into said annular recess through a slot in a central portion of said main body, said annular recess thereby forming a vacuum area, and said support rib comprises a gap therein, said gap being aligned with said slot in said central portion of said vacuum button so that an airway is formed through said slot and said gap.

15. The vacuum button of claim 14 wherein:

said main body comprises an annular groove on an upper surface thereof to accept a sealing element.

16. A method of securing a work piece in a machining operation without the use of clamps comprising the following steps:

a) providing a vacuum source with a plurality of vacuum ports, b) securing a button fixture plate on top of said vacuum source, said button fixture plate comprising a plurality of vacuum ports, c) placing a desired number and pattern of vacuum buttons in said vacuum ports, each said vacuum button comprising a central opening that forms an airway with a corresponding one of said vacuum ports and a recessed vacuum area, said number and pattern of vacuum buttons being selected based on characteristics of a work piece, d) blocking vacuum ports that are not to receive a vacuum button, and e) securing said work piece on a top surface of said vacuum buttons.

17. The method of claim 16 comprising further:

providing at least one raised support rib in said vacuum area, said support rib comprising a gap in communication with said central opening.

18. The method of claim 16 comprising further:

placing locating pins in said button fixture plate, said locating pins being in contact with said work piece to ensure that said work piece is properly positioned.

* * * * *